(12) United States Patent
Jones et al.

(10) Patent No.: US 11,014,794 B2
(45) Date of Patent: May 25, 2021

(54) PERSONAL LIFT DEVICE

(71) Applicant: Tulsa Winch, Inc., Tulsa, OK (US)

(72) Inventors: Tony Jones, Bixby, OK (US); Shane Strahl, Jenks, OK (US); Drew Morgan, Tulsa, OK (US)

(73) Assignee: Tulsa Winch, Inc., Jenks, OK (US)

( * ) Notice: Subject to any disclaimer, the term of this patent is extended or adjusted under 35 U.S.C. 154(b) by 209 days.

(21) Appl. No.: 16/042,677

(22) Filed: Jul. 23, 2018

(65) Prior Publication Data

US 2019/0023548 A1 Jan. 24, 2019

Related U.S. Application Data

(60) Provisional application No. 62/535,642, filed on Jul. 21, 2017.

(51) Int. Cl.
| | | |
|---|---|---|
| *B66F 11/04* | (2006.01) | |
| *B60B 19/00* | (2006.01) | |
| *B66F 9/24* | (2006.01) | |
| *B66F 9/075* | (2006.01) | |
| *B66F 17/00* | (2006.01) | |
| *B66F 7/06* | (2006.01) | |
| *B60B 19/12* | (2006.01) | |

(52) U.S. Cl.
CPC ............ *B66F 11/04* (2013.01); *B60B 19/003* (2013.01); *B66F 9/0755* (2013.01); *B66F 9/24* (2013.01); *B66F 11/046* (2013.01); *B66F 17/006* (2013.01); *B60B 19/12* (2013.01); *B66F 7/06* (2013.01)

(58) Field of Classification Search
CPC ............................... B66F 11/04; B66F 11/046
USPC .................................................. 182/141, 68.4
See application file for complete search history.

(56) References Cited

U.S. PATENT DOCUMENTS

| | | | | |
|---|---|---|---|---|
| 3,858,688 | A * | 1/1975 | Galloway | B66F 11/04 187/224 |
| 3,910,264 | A * | 10/1975 | Mahieu | B64F 1/315 182/69.4 |
| 4,382,743 | A | 5/1983 | Newell | |
| 4,967,733 | A * | 11/1990 | Rousseau | B66F 11/04 182/13 |
| 6,175,124 | B1 | 1/2001 | Cole et al. | |
| 6,349,793 | B1 * | 2/2002 | Kincaid | B66F 11/04 182/141 |
| 7,847,504 | B2 | 12/2010 | Hollis | |
| 9,327,953 | B2 * | 5/2016 | Sayles | B66F 17/006 |
| 9,410,659 | B2 * | 8/2016 | Troy | F16M 11/18 |
| 9,701,525 | B1 * | 7/2017 | Cui | B66F 11/04 |

(Continued)

FOREIGN PATENT DOCUMENTS

| | | |
|---|---|---|
| CN | 104787708 A | 7/2015 |
| CN | 106882741 A | 6/2017 |

(Continued)

OTHER PUBLICATIONS

International Search Report and Written Opinion prepared by the ISA/US for PCT/US2018/043324 and dated Nov. 9, 2018 for Applicant: Tulsa Winch, Inc.

*Primary Examiner* — Alvin C Chin-Shue
(74) *Attorney, Agent, or Firm* — David G. Woodral; GableGotwals

(57) ABSTRACT

A device includes an elevating work platform affixed to a drive unit that can move in any direction and rotate in place.

13 Claims, 9 Drawing Sheets

(56) References Cited

U.S. PATENT DOCUMENTS

| | | | | |
|---|---|---|---|---|
| 9,903,126 B2* | 2/2018 | Rowsome | ............... | E04G 1/24 |
| 2009/0155033 A1* | 6/2009 | Olsen | ............... | E04G 1/28 |
| | | | | 414/462 |
| 2013/0168186 A1* | 7/2013 | Valtonen | ............... | B66F 11/04 |
| | | | | 182/113 |
| 2017/0120443 A1* | 5/2017 | Kang | ............... | B25J 5/007 |
| 2017/0129133 A1* | 5/2017 | Bolivar | ............... | B28B 1/001 |
| 2017/0144547 A1* | 5/2017 | Fuhlbrigge | ............... | B60L 50/66 |
| 2017/0291802 A1* | 10/2017 | Hao | ............... | B60G 9/02 |
| 2017/0341465 A1* | 11/2017 | Zdrahal | ............... | B66F 9/07577 |

FOREIGN PATENT DOCUMENTS

| | | | | |
|---|---|---|---|---|
| JP | 05116897 A | * | 5/1993 | |
| JP | 05294600 A | * | 11/1993 | ............ B66F 11/04 |
| KR | 20170082853 A | | 7/2017 | |
| WO | 199804168 | | 2/1998 | |

* cited by examiner

PERSONAL LIFT DEVICE

CROSS-REFERENCE TO RELATED CASES

This application claims the benefit of U.S. provisional patent application Ser. No. 62/535,642, filed on Jul. 21, 2017, and incorporates such provisional application by reference into this disclosure as if fully set out at this point.

FIELD OF THE INVENTION

This disclosure relates to elevated working platforms in general and, more particularly, to devices for providing lift to workers and tools.

BACKGROUND OF THE INVENTION

Ladders are a known safety risk, as even with proper placement is it possible to slip and fall from a ladder. Similar issues are encountered with scaffolding. Again, even if the scaffolding is safely constructed and properly installed, entry and egress present opportunities for falls and injuries. The user must generally ascend by climbing to the work surface serviced by the scaffolding. Ladders, scaffolds, and the accompanying tooling present trip and fall hazards to workers who may not even be utilizing the ladder or scaffold.

Ladders alone are believed to result in over 90,000 emergency room treatment visits annually in the United States. Over 20,000 non-fatal injuries and over 150 fatalities occur annually on jobsites.

Existing personal lift devices can elevate and lower a user such that it is not necessary to scale any significant height by climbing. However, these are generally large devices with complex controls related to both driving the device into position and then elevating it to a working location. The footprint of such existing lift devices is much larger than a person and difficulty can arise in safely maneuvering such a device, particularly since visibility may be limited by the size of the device and the location of the controls. Smaller lifts also exist but these must be manually moved into position similar to a ladder.

What is needed is a system and method for addressing the above, and related, issues.

SUMMARY OF THE INVENTION

The invention of the present disclosure, in one aspect thereof, comprises a device having a work platform and a drive unit that selectively moves the work platform over a work surface. The device includes a lift mechanism that selectively elevates the work platform above the drive unit. The drive unit also provides the ability to move in any direction and to rotate in place.

In some embodiments, the drive unit includes a plurality of Mecanum wheels. The drive unit may comprise a wheel base and a tilt platform affixed thereto via a joint that allows for adjustment of an angle between the tilt platform and the wheel base in any direction. A pair of levelers may be attached to both the wheel base and the tilt platform and are selectively operable to adjust the angle between the tilt platform and the wheel base.

The device may include a pair of telescoping uprights rigidly affixed to the tilt platform and the drive unit, the lift mechanism elevating the work platform by extension of the pair of telescoping uprights. Each of the pair of telescoping uprights may comprise an inner segment joined to the tilt platform, and an outer segment joined to the work platform, the inner segment being slidingly engaged into the outer segment. In some embodiments, the lift mechanism comprises a chain affixed along a length of at least one of the inner segments of the pair of telescoping uprights and an electric motor configured to traverse the work platform along the chain.

The device may include a microcontroller operable to adjust the levelers, and an accelerometer communicatively coupled to the microcontroller, the microcontroller adjusting the angle between the tilt platform and the wheel based using input from the accelerometer. A gyroscope may be communicatively coupled to the microcontroller, the microcontroller adjusting the angle between the tilt platform and the wheel based using input from the gyroscope.

The invention of the present disclosure, in another aspect thereof, comprises a device having a drive unit having a wheel base including a sufficient quantity of Mecanum wheels to allow translation in 365 degrees and rotation in place. A work platform is joined to the drive unit and has an elevation mechanism that raises and lowers the work platform relative to the drive unit. The device includes a leveling joint that allows the work platform to change its angle relative to the drive unit such that the work platform maintains a predetermined work angle regardless of the angle of the drive unit.

The drive unit may further comprise a tilt platform rigidly affixed to the work platform and the levelling joint. The device may include a pair of actuators joined to the tilt platform and the wheel base and spaced apart from the levelling joint, the actuators configured to change a distance between the tilt platform and the wheel base at their respective locations, thereby adjusting the angle between the tilt platform and the wheel base.

The device may further comprise a pair of telescoping uprights joining the work platform to the drive unit. The elevation mechanism may raise and lower the work platform by extension and contraction of the telescoping uprights. In some embodiments, at least one of the pair of telescoping uprights extends above a footpad of the work platform to form part of a user safety cage.

The invention of the present disclosure, in another aspect thereof, comprises a device including a drive unit that is operable to translate in any direction and to rotate in place without translation. A work platform is affixed to the drive unit and configured to support a user in a work position, whereby the user also controls the drive unit from the work platform. An elevation mechanism is configured to selectively elevate the work platform relative to the drive unit upon a user command.

In some embodiments, the drive unit comprises a plurality of electrically driven Mecanum wheels. The drive unit may further comprise a tilt platform to which the work platform is affixed, the tilt platform allowing an angle between the drive unit and the work platform to be altered. In some embodiments, the angle between the drive unit and the work platform is alterable in 365 degrees of freedom.

The device may have a pair of telescoping uprights that extend to selectively elevate the work platform, the pair of telescoping uprights extending a fixed distance above the work platform.

DETAILED DESCRIPTION OF THE PREFERRED EMBODIMENTS

Figure 1:
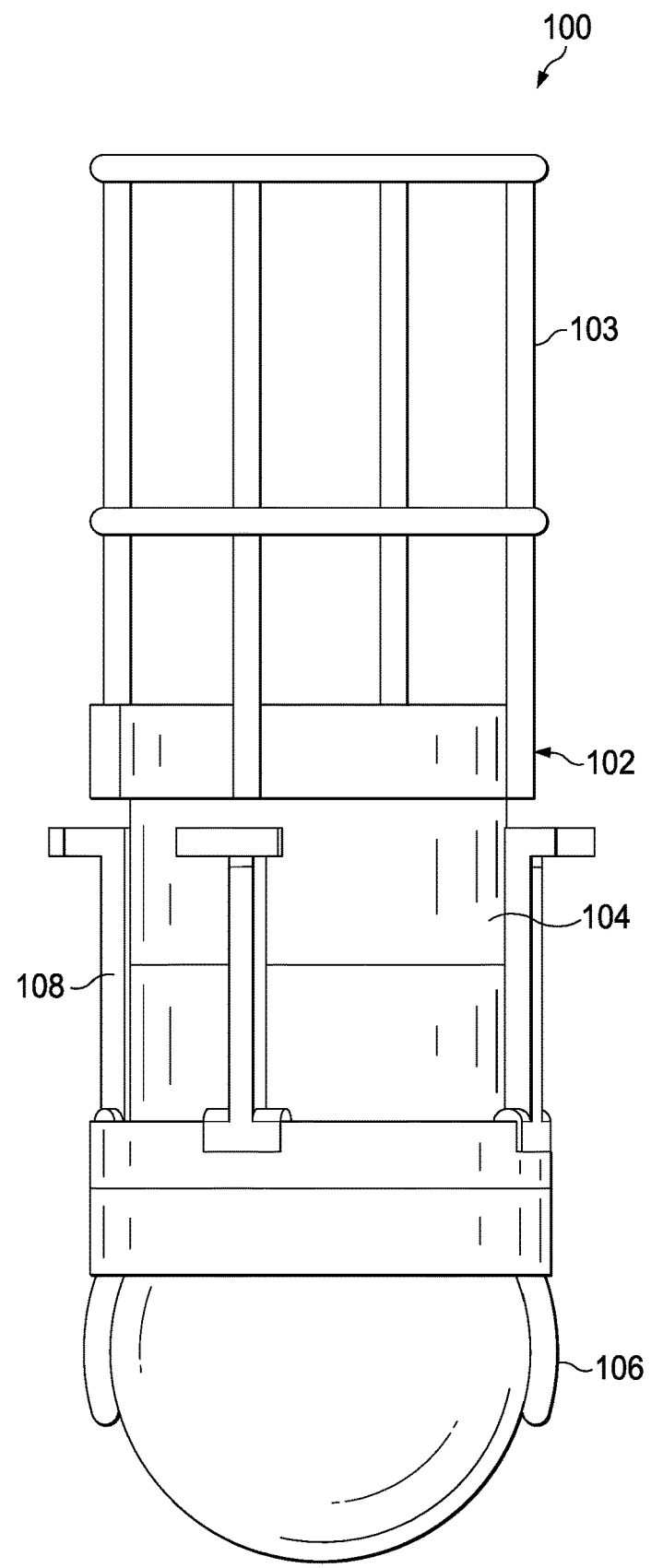
FIG. 1 is a side view of a personal lift device according to aspects of the present disclosure.

Referring now to FIG. 1, a side view of a personal lift device 100 according to aspects of the present disclosure is shown. The personal lift device 100 may take the place of a movable device such as a ladder as well as a stationary device such as a scaffold. The device 100 may include a work platform 102 that provides a stable work surface for standing and/or holding or supporting tools or other equipment. The size of the work platform 102 may vary but is sufficient for a single worker in one embodiment. In some embodiments, the size of the work platform 102 is kept to the minimum needed for safe operation by a single user in order to increase utility and maneuverability, and minimize power requirements, among other reasons.

The platform 102 may be equipped with a safety cage 103 that may include a gate, opening, or cutaway to allow ingress and egress. The cage 103 may also function as a tool carrier replicating a tool belt that need not be worn on the person. The cage 103 or another portion of the platform 102 may also be equipped with power outlets for operation of power tools. An on-board power cell or battery may be used to supply power. In some embodiments, the on-board power supply may be a hybrid type power supply having a battery plus an internal combustion generator and/or inverter.

The platform 102 may be elevated or lifted by a lift mechanism 104. The lift mechanism may be hydraulic or electric and may comprise a scissor lift device, a spiral lift device, or a combination of these or other mechanisms. Lift operation may be controlled by a control panel mounted on the platform 102 or cage 103. In another embodiment, lift operations are controlled by a remote control available to the user who may control operations from the platform 102 or elsewhere. In various embodiments, the lift mechanism may be constructed to provide a height of up to 15 feet, or more, for the work platform 102.

The device 100 is mobile and may be moved or placed where the user has need of an elevated position to work effectively. An omni-directional drive unit 106 may be utilized as a transportation mechanism for the entire device 100. In the present embodiment, a single ball drive (e.g., a "ball bot") device may be utilized as the omnidirectional drive unit 106. It should be understood that the drive unit 106 alters its position horizontally in a dynamic fashion to maintain a balanced vertical orientation. The drive unit 106 (and other drive units described below) can alter its position to remain below the work platform 102 even when the position of a load (e.g., an operator) changes or the device 100 changes locations. In addition to a mobile omnidirectional drive unit 106, a jointed connection (not shown) can allow for further manipulations and adjustments between the platform 102 and the drive unit 106 to maintain vertical orientation or balance.

Various inertial sensors, gyroscopic sensors, and accelerometers may be employed to ensure stability and mobility of the device 100, even when under substantial load. Other sensors may be deployed by the persona lift device 100 including, but not limited to, optical, infrared, acoustic, ultrasonic, radar, laser, temperature, and contact or tactile sensors to keep the device 100 "aware" of its surroundings as it is operated. One or more integrated circuit based control systems is included as part of the drive mechanism 106 and may determine proper feedback, balancing, and other operations based at least in part from such sensors. On board diagnostic hardware or software may also be provided such that the device 100 can issue warnings or refrain from beginning operations if any critical system is suspected of being inoperative or in some way compromised. Other security measures may include password/PIN locks and facial and/or voice recognition of the operator.

Based on the included sensors and programming of the controllers of the lift 100, it may be able to avoid obstacles in its path when moving. Verbal commands may be accepted from the operator (distinguished by voice recognition) to allow some degree of hands-free operation.

In the embodiment shown, the drive mechanism 106 employs a single ball that is capable of rotation in any direction for motion and stability. A plurality of drive wheels may be located on an interior of the drive mechanism 106 for imparting force and movement to the single ball. Although a single ball drive mechanism may provide some advantages over other types of omnidirectional drive mechanisms, the present disclosure is not limited to deployment of such devices with its various embodiments.

Figure 2:
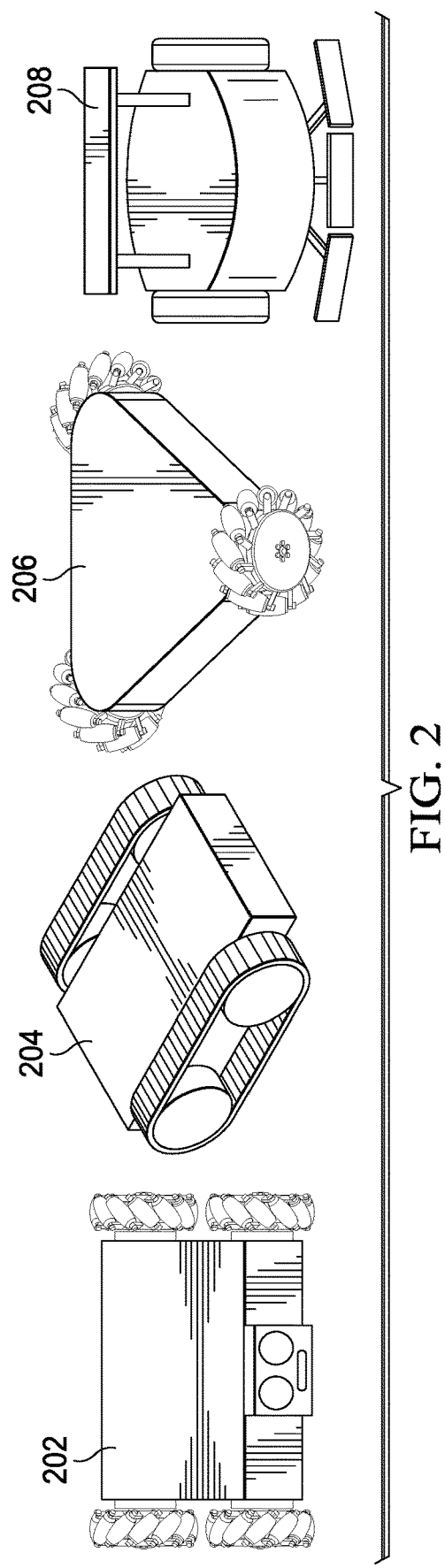
FIG. 2 is a perspective view of various alternate drive mechanism designs for a personal lift device according to aspects of the present disclosure.

Referring now to FIG. 2, a perspective view of various alternate drive mechanism designs for a personal lift device according to aspects of the present disclosure is shown. Drive unit 202 is based on a Mecanum wheel construction and utilizes four wheels. By altering the direction of drive of the wheels, the unit 202 can be moved in any direction. The wheels may be controllable independently of one another to allow for drive in any direction as well as rotation. The drive unit 202 may be utilized in place of the drive unit 106.

Drive unit 204 is a tracked device that may be utilized in place of drive unit 106. Two tracks may be utilized such that forward or reverse motion can be achieved. The tracks may be rotated opposite to one another to allow for turning with the drive device's 204 own radius. A traversing mechanism may be deployed between the platform 102 and lift mechanism 104, or between the lift mechanism 104 and the drive unit 204, to allow the platform to remain facing the same direction while the drive unit 204 is rotated in a needed direction.

Drive unit 206 may be used in place of drive unit 106 and is based upon the use of 3 omni wheels. Various rotation schemes of the omni wheels allows the drive unit 106 to rotate in place or traverse in any direction. For example, if all three wheel turn in the same direction at the same speed the drive unit 206 (and the lift device 100) rotate. In another example, two wheels turning in opposite directions while the third is unpowered may move the device toward or away from the unpowered wheel.

Drive unit 208 is a 2-wheeled drive unit that may be used in place of drive unit 106. The drive unit 208 may first turn directions before moving (similar to tracked drive unit 204) and may therefore me used along with a traversing mechanism between the platform 102 and lift mechanism 104, or between the lift mechanism 104 and the drive unit 208. In some embodiments, a third wheel may be provided for balance of the drive unit 208, which may be unpowered but free to swivel in any direction needed.

Figure 3:
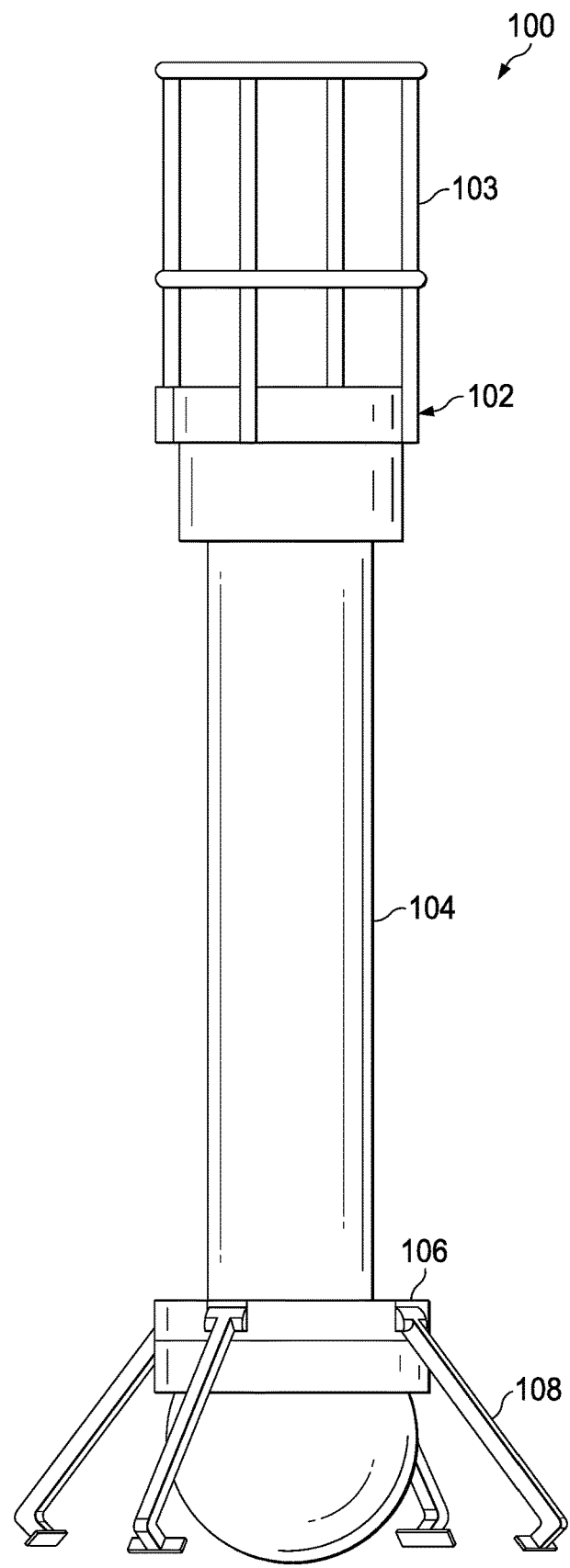
FIG. 3 is a side view of a personal lift device in an elevated configuration with extended stabilizers according to aspects of the present disclosure.

Referring now to FIG. 3, a side view of the personal lift device 100 in an elevated configuration with extended stabilizers 108 according to aspects of the present disclosure is shown. Stabilizers 108 serve to provide additional stability to the personal lift device 100 when needed. (Stabilizers 108 are shown retracted in FIG. 1). Stabilizers 108 may also allow for some degree of power conservation as the drive motors and balancing circuitry of the drive unit 106 may be powered off, or operated in a reduced power mode, when the stabilizers are deployed.

The stabilizers 108 may be selectively deployed at the option of the operator. The stabilizers may automatically deploy if an unstable condition is detected by the drive unit 106 or other component. Stabilizers 108 may also be configured to deploy if the drive unit 106 is powered down or reaches a predetermined state of depletion of the internal power source. The stabilizers 108 may comprise a single rigid member (possibly with a non-slip surface or foot attached) that rotates downward (FIG. 3) or is retracted upward (FIG. 1). In some embodiments, the stabilizers 108 may be articulated or linearly extendible to deal with uneven surfaces or to brace against locations other than the ground or immediate work surface.

FIG. 3 illustrates the lift mechanism 104 in an extended or lifted position. As discussed above, multiple lift mechanisms can be deployed. As shown in FIG. 3, the lift mechanism 104 may be based on a hydraulic cylinder arrangement or a spiral lift device. In some embodiments, access into the cage 103 or onto the work platform 102 may be limited (e.g., by an automatic lock) when the lift mechanism 104 is extended beyond a predetermined point.

Figure 4:
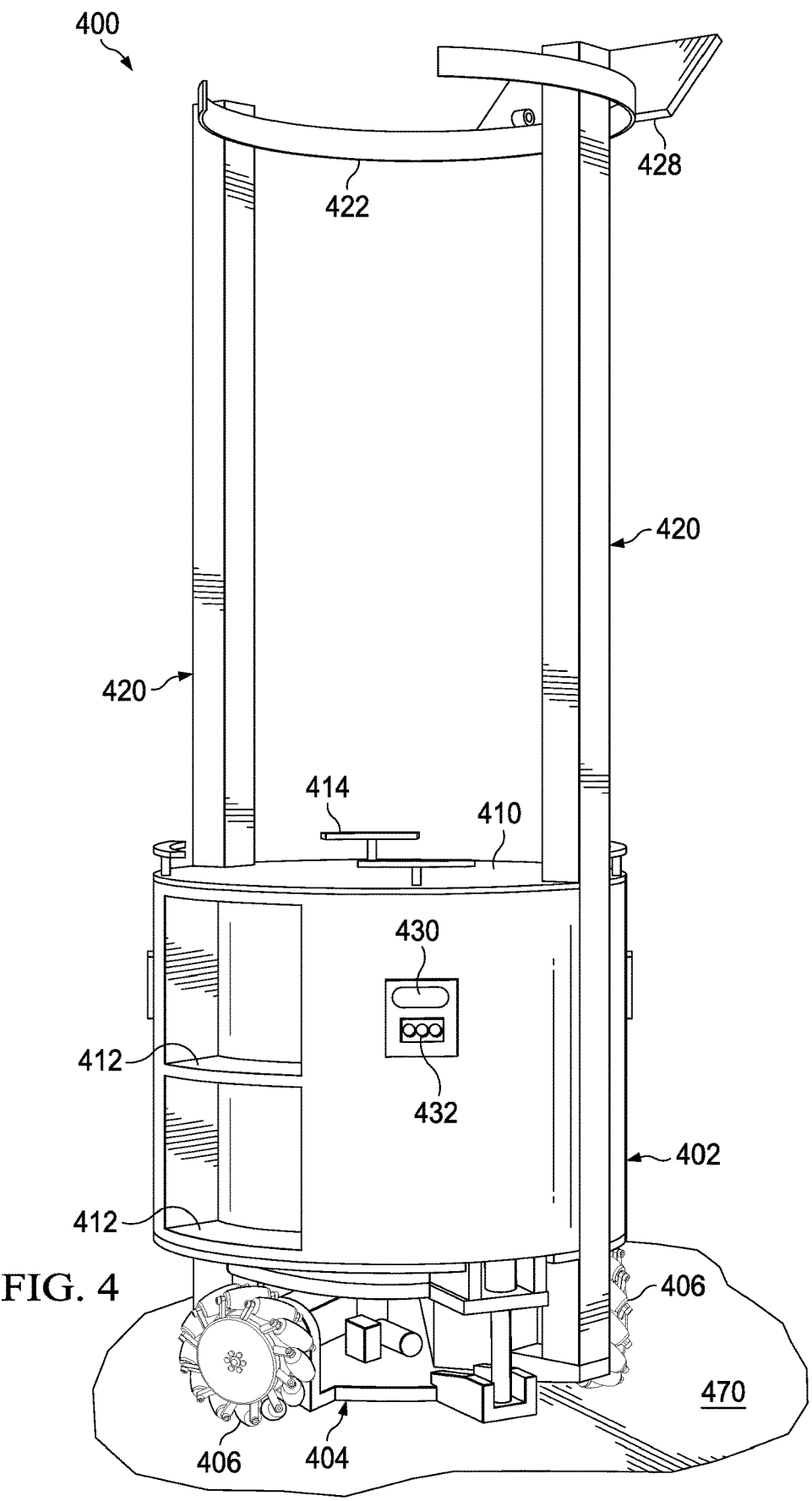
FIG. 4 is a side perspective view of another embodiment of a personal lift device according to aspects of the present disclosure.

Referring now to FIG. 4, a side perspective view of another embodiment of a personal lift device 400 according to aspects of the present disclosure is shown. The personal lift device 400 comprises a work platform 402 atop a drive unit 404. The drive unit 404 comprises a plurality of Mecanum wheels 406. In the present embodiment, there are three Mecanum wheels 406 approximately equidistantly spaced about 120 degrees apart around the circumference of the drive unit 404. As is known in the art, three Mecanum wheels spaced in this manner allows for travel or translation in any direction, as well as in-place rotation. Other embodiments may have more or fewer wheels, and omni-wheels may also be used. In further embodiments, a combination of powered wheels and freely rotating caster wheels can be used to simplify construction but some control an maneuverability may be lost.

The work platform 402 comprises a footpad 410 where a user may stand and work when using the personal lift device 400. The footpad 410, and the entire personal lift device, may be about 30" in diameter. In some embodiments, when the work platform 402 is fully lowed, the footpad 410 is about 36" from the ground or work surface 470. The maximum height may be up to around 7.5' in elevation from the work surface 470. Some embodiments provide a plurality of steps 412 to aid with ingress and egress. More or fewer steps 412 may be utilized than shown.

A user in position on the work platform 402 may have access to one or more pedals 414 that can be placed on the footpad 410. Pedals 414 may be used for hands-free operation of the personal lift device 400 and can control rotation, travel, elevation, or other functions. Pedals 414 are optional and may differ in appearance from that shown. In some cases, pedal control may be locked out to prevent inadvertent activation when the work platform 402 is being used to complete tasks not related to moving repositioning of the personal lift device 400 and/or elevation and lowering of the work platform 402. The personal lift device 400 may also provide power ports (not shown) to the user for hand tools and the like.

Extending upward from the drive unit 404 to the work platform 402, and beyond, are a pair of telescoping uprights 420. The present embodiment utilizes two uprights 402 but more can be used. Use of single upright is also possible but disadvantages in construction and weight increase may outweigh such benefits of less restricted access to the platform 402. The uprights 420 are telescopic such that they remain extended a fixed distance above the footpad 410 regardless of the elevation of the work platform 402. As discussed and shown below, the uprights 402 may contain part of a chain drive mechanism, or cable drive mechanism, serving as part of a raising and lowering mechanism for the work platform 402

A safety railing 422 may be placed on the uprights 402 at a height appropriate to help prevent a user from falling from the work platform 402. The railing 403 may be circular and approximately match the diameter of the footpad 410. In some embodiments, the railing 403 may have some degree of adjustment for taller or shorter users but may not be lowerable below a particular minimum height above the footpad 410. The railing 422 is shown as an interrupted circle in FIG. 4 but in other embodiments it may be a completed circular railing (which may require a user to "crawl" under when mounting the personal lift device 400). In other embodiments a moveable gate (not shown) or safety chain (not shown) may open and close to allow ingress and egress.

A control panel 428 may be provided at an appropriate height and angle to allow a user of the personal lift device 400 to operate the device. Functions may include, but are not limited to, elevation and lowering of the work platform 402, movement and rotation of the personal lift device, adjustment of an angle of the work platform 402 or footpad 410 relative to the drive unit 404, flashing of lights or sounding of horns and alarms, and communication and control with other personal lifts devices or other devices.

Knobs, buttons, sliders, switches, wheels, and other control implements as are known in the art may be provided to a user for manipulation and control of the personal lift device 400 and its functions. A capacitive or pressure sensitive touch screen may also be deployed alongside or instead of the aforementioned controls. In some cases, a non-touch-sensitive screen or segmented display may be provided for providing information only. Speakers and one or more microphones may also be provided to allow access to various functions. Although voice control is possible, as a matter of safety, voice identification may be implemented to prevent a non-user intentionally or unintentionally providing control commands to the personal lift device 400 that may not be intended by the user.

The personal lift device 400 may be provided with various features for the safety of bystanders and other non-users. In the present embodiment one or more warning lights 430 may be provided at various angles facing away from the personal lift device 400. These may flash, strobe, or provide steady state illumination as appropriate. In some cases, the function of the lights (e.g., steady or flashing) may change depending upon whether the personal lift device 400 is stationary, moving, raising/lowering, etc.

Various sensors 432 may be provided for automatic feedback to a control computer and/or information to be provided to a user of the personal lift device 400. These may include optical, infrared, acoustic, ultrasonic, radar, laser, temperature, contact, tactile, or other sensors, as with previously discussed embodiments. Cameras may also be utilized to provide images to the user and/or for further input to a control computer to allow autonomous operation and/or obstacle avoidance.

Figure 5:
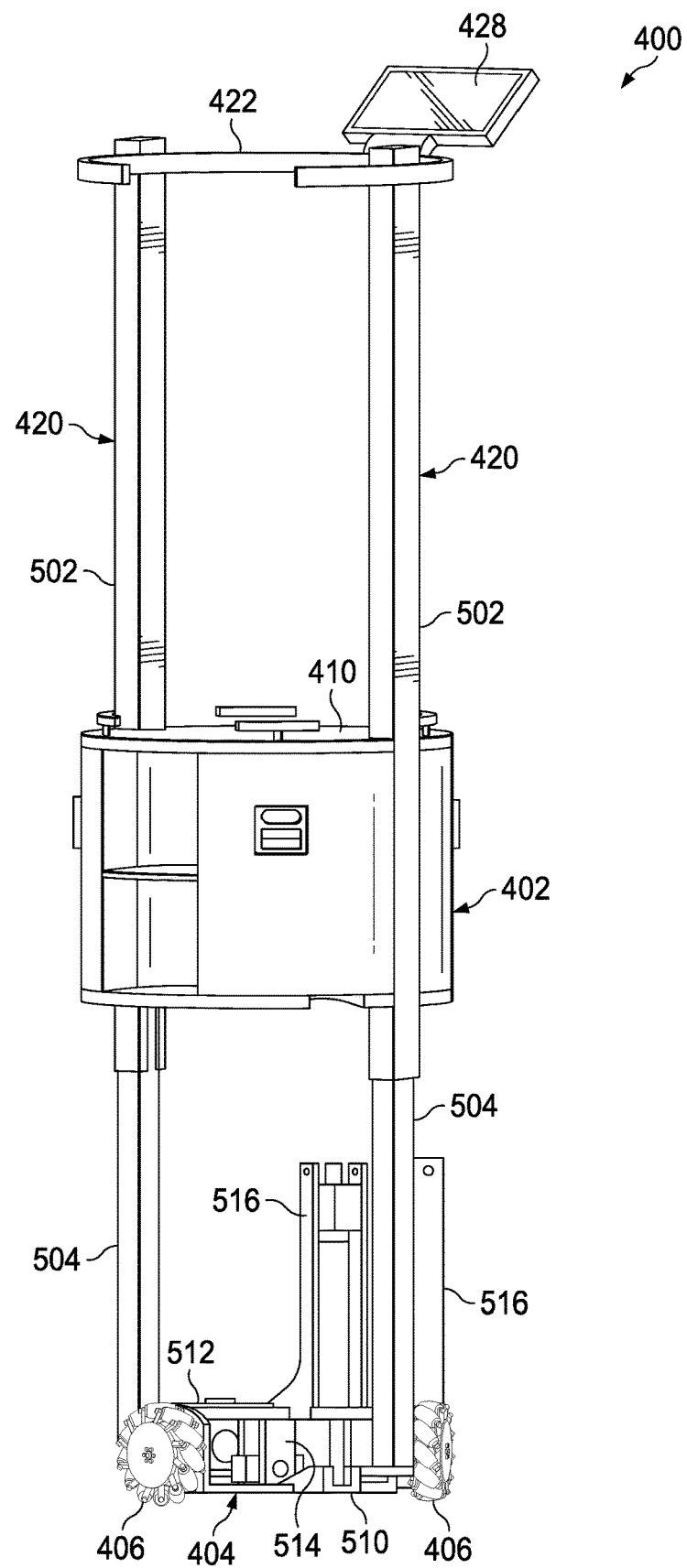
FIG. 5 is a side perspective view of the personal lift device of FIG. 4 in an elevated position.

Referring now to FIG. 5, a side perspective view of the personal lift device 400 is shown. The telescoping uprights 420 are partially extended in this view. They can be seen to each comprise an outer segment 502 that remains stationary with respect to the work platform 402 and an inner segment 504 that remains affixed to the drive unit 402. The inner segment 504 may be slidingly engaged into the inner segment 502. The inner segment 504 and outer segment 502 may have cooperating cross sectional shapes over at least a portion of their length to allow the telescoping uprights 420 to maintain sufficient rigidity even when extended. The inner segment 502 and outer segment 504 may each have a rectangular or rectilinear cross section, or each have a circular or oval cross section. In another embodiment, an outer contour of the inner segment 504 conforms to an inner contour of the outer segment 502, but the outer appearances may be allowed to differ.

The telescoping uprights could operate on a hydraulic mechanism, or an electric screw drive mechanism. However, in the present embodiment the work platform 402 elevates and lowers itself relative to the drive unit 404 by means of a chain or cable mechanism as discussed below. Roller bearings or other bearings (not shown) may also be used at the interface between the inner segment 504 and outer segment 502 to increase smooth operation and/or rigidity at the interface between the segments.

With the work platform 402 at least partially elevated, additional details of the drive unit 404 can be seen. The drive unit 406 provides for movement and turning of the personal lift device 400 via set of three Mecanum wheels 406. The Mecanum wheels 406 are affixed to a wheel base 510 that affixes to a tilt platform 512 via a movable joint 514. The joint 514 may be a universal joint or a two-axis gimbal that allows the tilt platform to tilt (or partially rotate) in two dimensions. The telescoping uprights 420 affix rigidly via the inner segments 504 to the tilt platform 512 such that the work platform 402 can tilt relative to the ground surface upon which the wheels 406 rest. In this way, the work platform 402 and footpad can be leveled if the wheels 406 and/or wheel base 510 are un an unlevel surface. The degree of allowable tilt can be selected based upon safety concerns including the amount of elevation permitted in the work platform. In some embodiments, the amount of tilt between the wheel base 510 and the tilt platform 512 will be at least 5 degrees such that the personal lift device 400 can safely operate on an ADA or OSHA compliant ramp.

It should also be understood that the relative positions of the inner segment 504 and outer segment 502 could be reversed. In other words, the outer segment 502 could be affixed to the tilt platform 512 and the inner segment 504 could remain affixed to the work platform 402. The elevation mechanism could operate in essentially the same way as the inner segment 504 extended upwardly as the work platform 402 elevated. However, this would create a potential pinch point for a user on the work platform 403 since the point of extension and contraction between the inner segment 504 and outer segment 502 would be closer to foot level.

In the present embodiment, the amount of tilt between the wheel base 510 and the tilt platform 512 is adjusted and maintained by a pair of levelers 516. In the present embodiment, the levelers 516 are electrically powered screw type mechanisms. Other types of linear electric actuators may be used. The levelers 516 could be hydraulic actuators as well, but in some embodiments the device 400 is intended to operate entirely on electrical power without the need for the added complexity, weight, and maintenance issues that can be associated with hydraulic systems. The levelers 516 may be offset from one another about 90 degrees about the periphery of the wheel base 510 and the tilt platform 512. The attachment mechanism between the wheel base 510 and the tilt platform 512 is discussed in further detail below.

Figure 6:
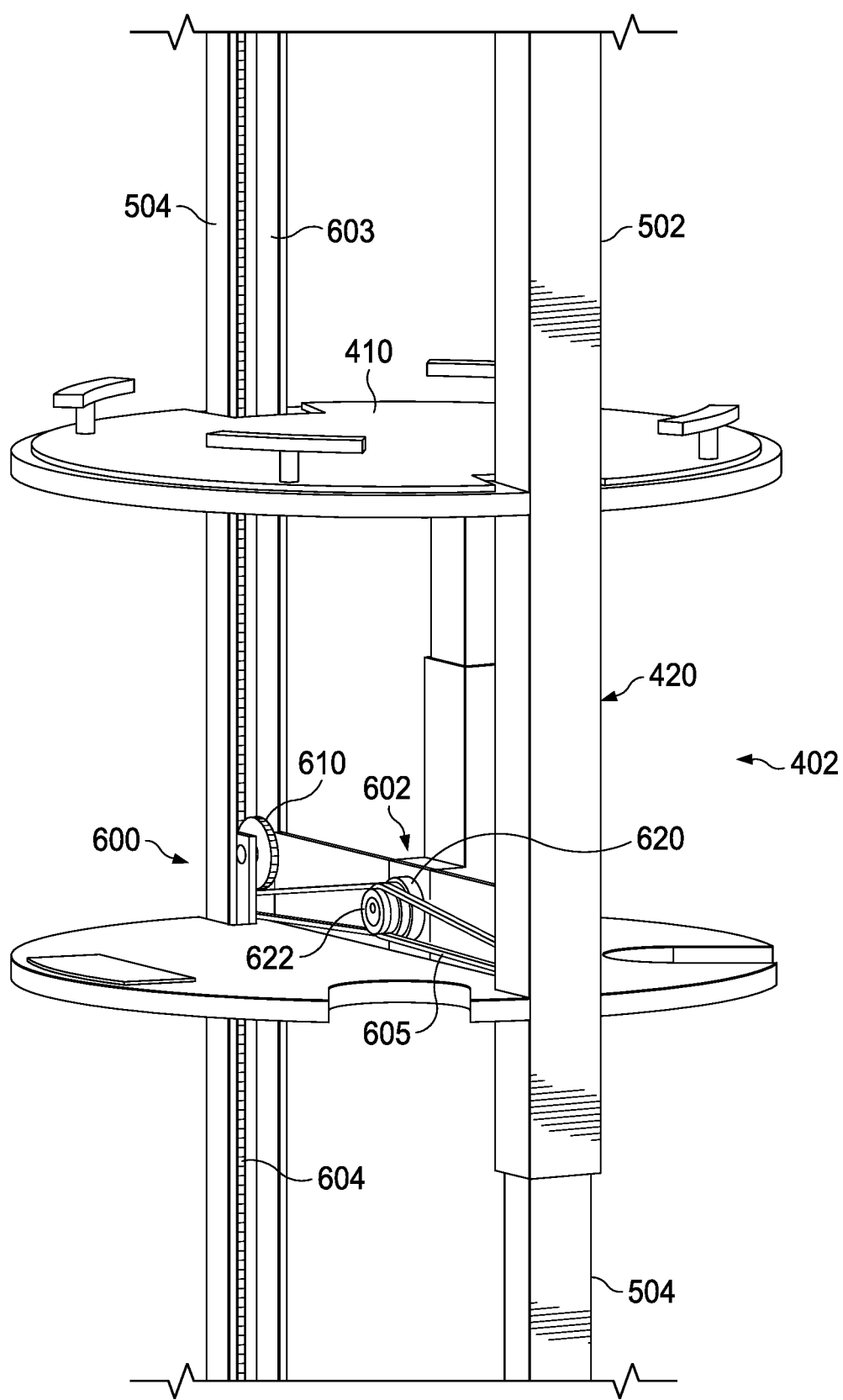
FIG. 6 is a close-up partial cutaway view of a work platform of a personal lift device according to aspects of the present disclosure.

Referring now to FIG. 6, a close-up partial cutaway view of the work platform 402 of the personal lift device 400 is shown. Some external covers and components of the work platform 403 are removed to illustrate some internal mechanisms such as the elevation and lowering mechanism 600. On the left side of the view of FIG. 6, the outer segment 502 of one of the telescoping uprights 420 is also removed for clarity.

The elevation and lowering functions of the personal lift device 400 may be operated by an electric drive unit 602, which may further include an electric motor and gearing mechanism 602. In the present embodiment, a chain 604 is tightly strung along an internal channel 603 of each of the inner segments 504. The chain 604 may extend from at or near a bottom of the inner segment 504 to at or near a top of the inner segment. This allows the work platform 402 to traverse the entire length of the inner segment 504 by movement or traversal along the chain 604. An idler gear or sprocket 610 may be rigidly affixed to the work platform 402 where the chain 604 alters direction inwardly from the channel 603 and engages with a drive sprocket 620 before reversing back to the channel 603. A second idler sprocket (not shown) may be provided below the drive sprocket 610 where the chain 604 returns to a vertical orientation within the channel 603. The opposite side of the drive mechanism 600 may be configured as a mirror image with a second chain 605 engaging the drive unit 602 via a second drive sprocket 622. Drive sprockets 620, 622 may be geared to rotate in opposite directions, or each may be powered by a second electric motor within the drive unit 602.

Figure 7:
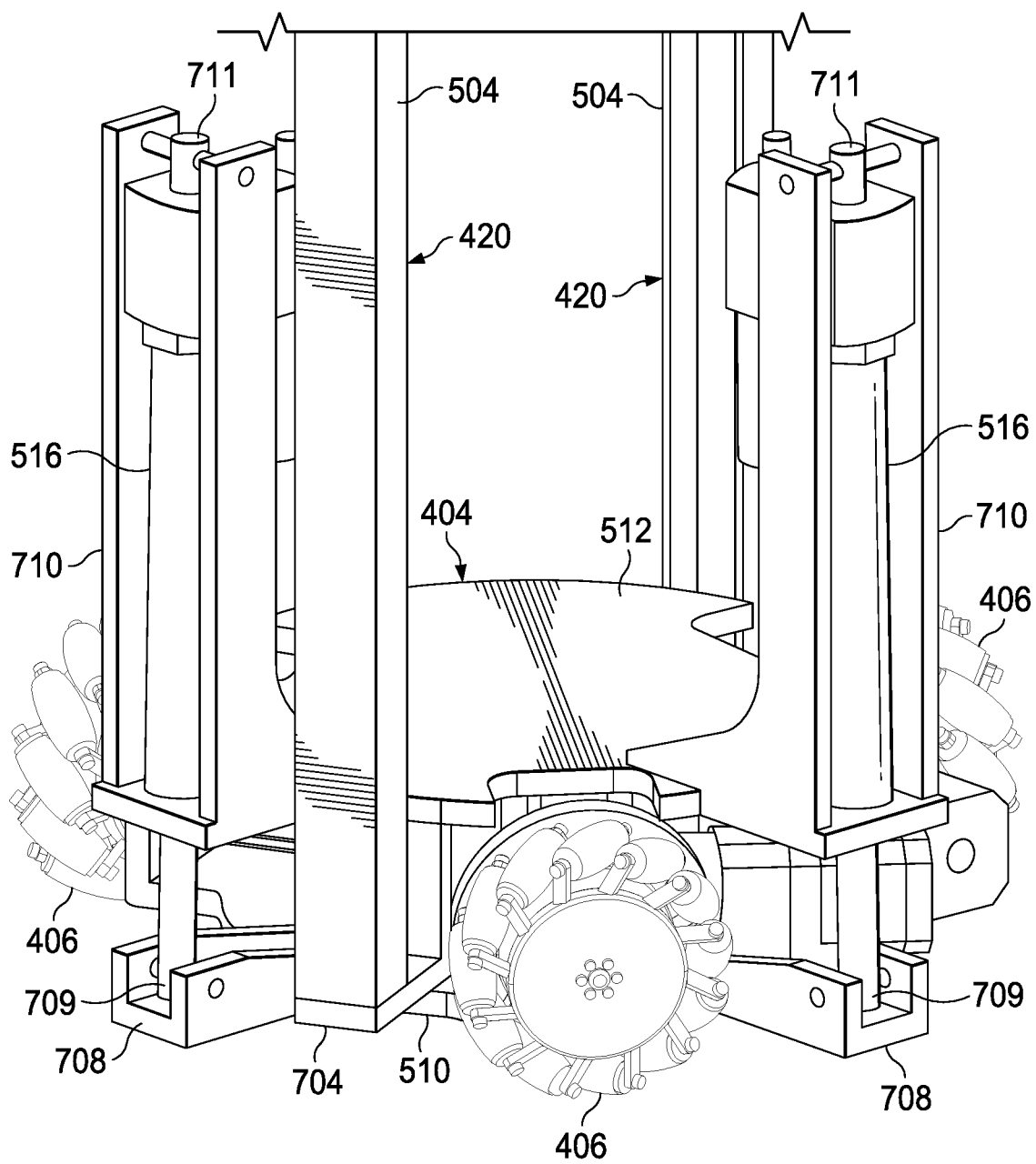
FIG. 7 is a close-up view of a lower portion of a personal lift device with platform raised for increased visibility according to aspects of the present disclosure.

Referring now to FIG. 7, a close-up view of a lower portion of the personal lift device 400 according to aspects of the present disclosure is shown with the work platform 402 raised for increased visibility. The telescoping uprights 420 each attach to the tilt platform 512 via a bracket 704. The bracket may be L-shaped or have another height reduction configuration such that the uprights 420 attach lower to the ground than the main surface of the tilt platform 512. This allows a greater elevation/lowering range than otherwise for the work platform 402 and keep the center of gravity of the components lower.

The levelers 516 may attach to both the tilt platform 512 and the wheel base 510 and extend and contract to adjust the level of tilt of the tilt platform 512 relative to the wheel base 510. The levelers may attach to the wheel base 510 at mounting brackets 708 which may extend laterally from the wheel base 510. Again, the brackets 708 may be placed as low as possible to allow the levelers 516 room to operate while they are located as low as possible as well. In some embodiments, the brackets 708 provide a platform for mounting or attachment of the levelers 516 that is below a midline of the Mecanum wheels 406.

As the tilt platform 512 may tilt with respect to the wheel base 510, the levelers 516 may attach to the bracket 708 by a hinge or pined joint 709 that allows at least some degree of rotational freedom. A two-axis gimble may be used to allow two-axis rotation, but a single pin connection that allows two degrees of freedom at least over a limited range may also be used here.

The levelers 516 may attach to the tilt platform in brace towers 710. The brace towers 710 extend upwardly from the tilt platform 512 a sufficient distance to accommodate the levelers 516 and associated mechanisms while allowing the tilt platform 512 itself to remain as low as possible. The levelers 516 may attach to the respective brace towers 710 by means of a joint 710. Once again, the joint 710 may be hinged, pinned, or rotatable. A two-axis gimbal may be used, or a single pinned joint allowing sufficient rotational freedom across two axes may be used.

The brace towers 516 and the mounting brackets 508 may be displaced toward the edges (i.e., radially away from the enter) of the tilt platform 512 and wheel base 510, respectively, both to allow the work platform 402 room to ascend and descend without interference, and also to allow the levelers 516 to have a mechanical advantage with respect to tilting the tilt platform 512 about the joint 514 (FIG. 5). However, as can be seen in FIG. 4, the brace towers 710 may fit into the interior of the work platform 402 when it is lowered. The general shape of the brace towers 710 may be L-shaped with a foot joining to the tilt platform and radially displacing an upright portion into which the levelers 516 are fitted.

Figure 8:
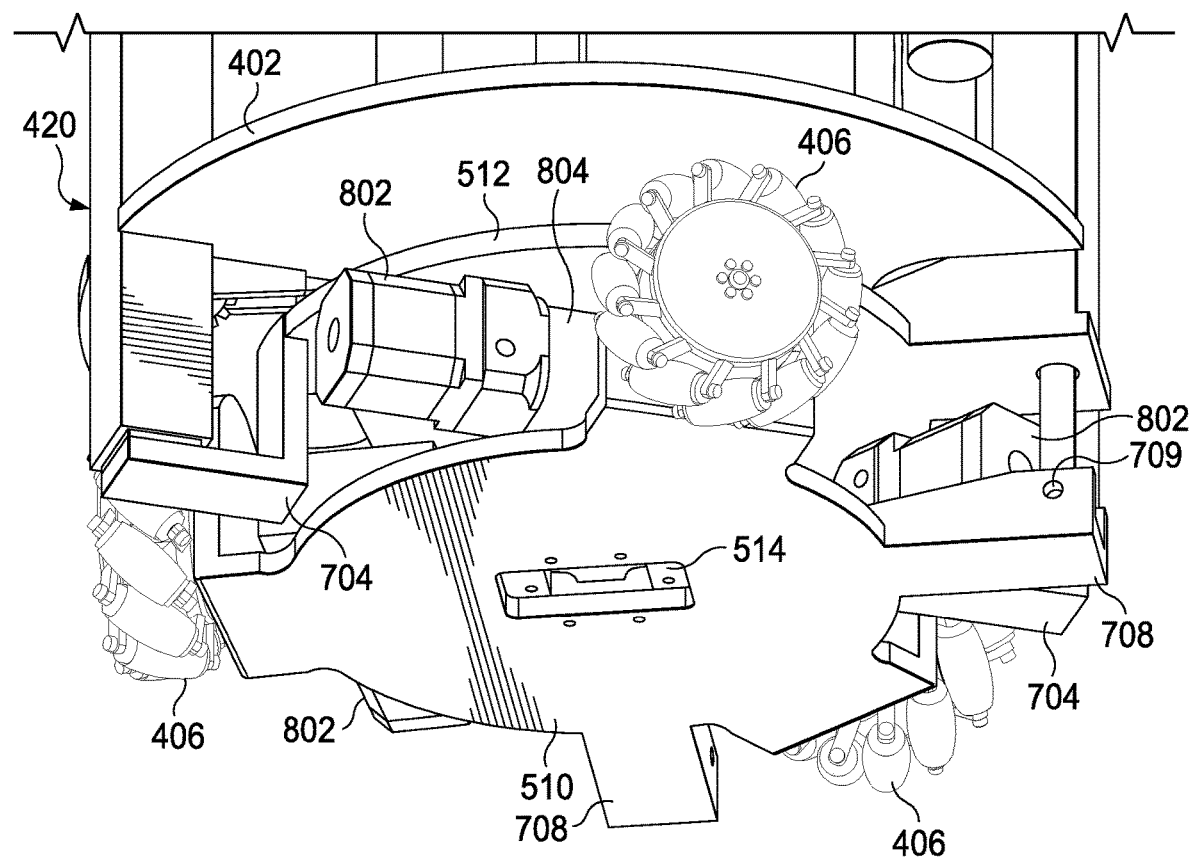
FIG. 8 is a bottom perspective view of the personal lift device of FIG. 4.

Referring now to FIG. 8, a bottom perspective view of the personal lift device 400 is shown. From this view point it can be further appreciated that the brackets 704 provide a mounting point for the telescoping uprights 420 that is very near the ground surface 470 rested upon by the wheels 406. The mounting brackets 708 may also provided at or near the lowest point of the wheel base 510.

Mounted to the wheel base 510 are wheel drive motors 802. Although a transmission arrangement might be used, here there is a drive motor 802 for each wheel. Again, the motors 802 may be mounted as low as possible for improvement of center of gravity. The motors may be displaced somewhat radially away from the center of the wheel base 510 for the same reason. However, the joint 514 between the wheel base 510 and the tilt platform 512 may occupy the very center of the wheel base 510 (and the very center of tilt platform 512).

It may be necessary or desirable to mount the motors 802 offset from each respective wheel 406. In this case a gear box 804 may be used for each wheel 406 and motor 802 combination. The gear boxes 804 may each have the same angle of input and output, or the angle may differ if needed. The gear boxes 804 may comprise bevel gears and may have an increasing, decreasing, or 1:1 ratio.

It can also be seen from FIG. 8 that the tilt platform 512 may only be so far from the wheel base 510 to allow clearance for the joint 514, the motors 802, the gearboxes 804, and/or any other necessary componentry mounted to the wheel base on below the tilt platform 512. The tilt platform 512 may also be displaced above the wheel base 510 (e.g., the joint 514) to allow the desired degree of tilt between the tilt platform 512 and the wheel base 510 without encroaching on any internal components. A lower most portion of the work platform 402 can also be seen in FIG. 8 to descend so low as to touch, or nearly touch, the tilt platform 512.

The personal lift device 400 can also be provided with outriggers (e.g., 108, FIG. 1) for increased stability in certain situations. These would normally be deployed when the device 400 is stationary and extra stability is needed at the expense of being able to maneuver. In some embodiments, the outriggers 108 may automatically deploy if the work platform 402 elevates beyond a predetermined degree, or when the device 400 is reaching a low power state. In another embodiment, the wheels 406 may be extendable outwardly from the wheel base 510 to increase stability in certain situations (at the potential expense of maneuverability). This may be accomplished by additional electric actuators (not shown) or other mechanisms and may be a selective or automatically deployed feature.

Figure 9:
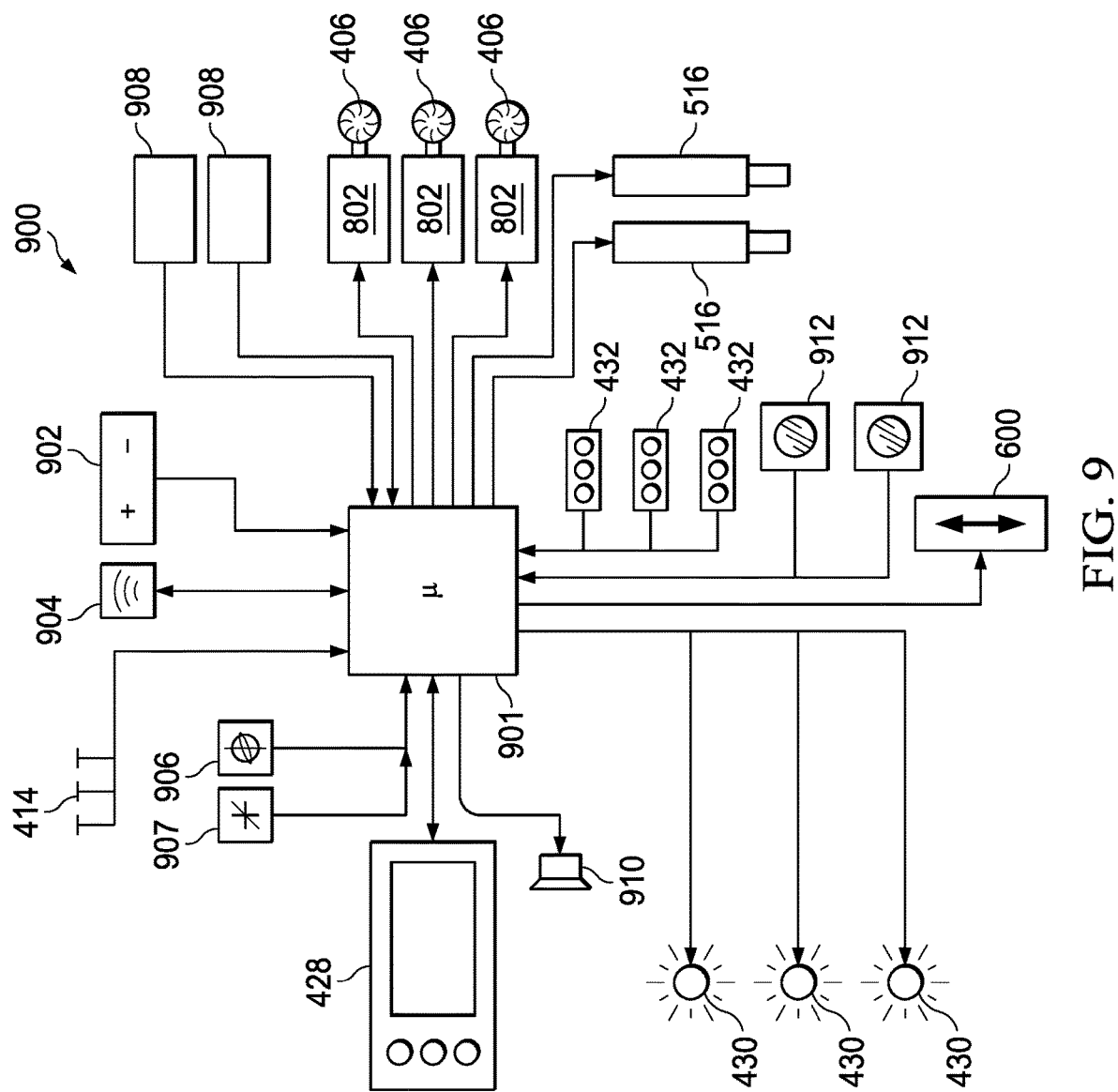
FIG. 9 is a simplified system control diagram for use in a personal lift device according to aspects of the present disclosure.

Referring now to FIG. 9, a simplified system control diagram 900 for use in a personal lift device according to aspects of the present disclosure is shown. The diagram 900 provides indication of major control signals and possible directions for these signals. The diagram 900 does not indicate necessary relays, power leads, signal conditioning circuitry, overload protection, and other wiring as is known in the art.

The control system 900 may be based around a microcontroller 901. The microcontroller 901 may be a general purpose, programmable controller, or may be a personal computer, tablet, or other general-purpose computing device. The microcontroller 901 may also be emulated as a program or component of a general-purpose computing device. In other embodiments, the microcontroller 901 is a purpose-built device adapted particularly for operating a personal lift device according to the present disclosure.

The personal lift devices of the present disclosure (e.g., 100, 400) may be powered by a single battery or battery unit, or a series of batteries or battery units. Here, a single battery 902 is shown communicatively coupled to the microcontroller 901. The battery 902 may be connected to many or most components shown in the diagram 900 (e.g., motors 802) but these connections are omitted for simplicity, and are known in the art. The battery 902 may be communicatively coupled to the microcontroller 901 in order to report charge and discharge levels. Overheating and other conditions may also be reported to the microcontroller 901.

The microcontroller 901 may independently control both power and direction for each of the wheels 406 via motors 802. As described, independent manipulation of each Mecanum wheel 406 allows a personal lift device 400 to rotate in place, move in any direction, and/or turn while moving. In embodiments relying on a ball-bot or other type of omnidirectional drive unit (e.g., 100, FIG. 1), necessary connections are provided that enable the microcontroller 901 to adequately control the drive unit (whether a series of electric motors, or otherwise).

The personal lift devices of the present disclosure may have a gyroscope 906 providing movement, rotational, or tilt information to the microcontroller 901. Physically, the gyroscope 906 may be located anywhere on the device associated with or related to the position of the work platform 402. In some cases, the gyroscope 906 is located on the same logic board as the microcontroller 901. In other embodiments, the gyroscope 906 is located elsewhere and is communicatively coupled to the microcontroller 901. An accelerometer 907 may also be provided in a location associated with the work platform 402 instead of, or in addition to, the gyroscope 906.

Both the gyroscope 906 and the accelerometer 907 may be solid state devices that are communicatively coupled to the microcontroller 901 (or integrated therewith) to report rotation, movement, and/or tilt of the work platform 402.

The microcontroller 901 takes the information from the gyroscope 906 and/or accelerometer 907 to determine the position of the work platform 402 in three-dimensional space. During operation of the personal lift devices of the present disclosure (e.g., 100, 400) the device may be required to operate upon uneven ground or an uneven work surface. The microcontroller may display a warning via the control panel 428 or other means and/or auto level the work platform 402 by activating one or both of the levelers 516.

The microcontroller 901 may also use information from the gyroscope 906 and/or accelerometer 907 to detect tip over events. If the drive unit is a ball-bot type device, the microcontroller 901 may rely on the gyroscope 906 and/or accelerometer 907 more or less continuously to keep the device 100, 400 safely upright and balanced whether moving or not. In the case of a device such as the personal lift device 400, information from the gyroscope 906 and/or accelerometer 907 may still be continuously monitored such that if the personal lift device 400 begins to tip for any reason, the microcontroller 901 can activate the levelers 516 and/or one or more wheels 406 to attempt to keep the device righted.

Pressure sensors 908 may also be used at various locations in or on a personal lift device (100, 400). For example, pressure sensors 908 can be placed to detect the position of a user standing on the footpad 410 of the work platform 402. In another embodiment, pressure sensors 908 may be configured to determine and report the weight being born at each of the wheels 406, by each leveler 516, and/or the joint 514. In some embodiments, pressure sensors 908 that are placed to determine where on the footpad 410 a user has shifted his or her weight can be used to control or partially control movement or rotation of the personal lift device 100, 400. For example, a user moving toward an edge of the work platform 403 or footpad 410 might thereby signal to the microcontroller 901 to move the personal lift device 100, 400 toward the direction of pressure relative to the work platform 402 if it is safe to do so. Audible or visual warnings may also be provided to a user and/or bystanders if the microcontroller 901 detects, based on sensor input, that user is in danger of tipping the personal lift device 100, 400.

Pressure sensors 908 or other feedback mechanisms may be used to indicate to the microcontroller 901 how much weight is being borne by the work platform 402. A warning may be indicated if the work platform 402 is over limit. If a sudden increase in weight or pressure on the work platform 402 is detected during raising or lowering of the work platform 402, it may be that the work platform 402 has encountered an obstacle and should be reversed (possibly automatically and possibly with an indicated warning).

Additional sensors that might provide useful information to the microcontroller 901 and/or a user include, but are not limited to optical, infrared, acoustic, ultrasonic, radar, laser, temperature, and contact or tactile sensors. Sensor banks 432 may be communicatively coupled to the microcontroller 901 and provide locations for these sensors (as shown in FIG. 4, for example). Two separate cameras 912 are also shown communicatively coupled to the microcontroller 901. Physically, the cameras 912 may be located anywhere they would provide a useful point of view. Image processor and/or pattern recognition may be implemented to aid the user in avoiding obstacles (e.g., by warnings or displays) or used to enable the microcontroller 901 to navigate a work environment automatically. The present disclosure is not intended to be limited by the number, type, or placement of sensors unless indicated in the respective claim.

In some cases, sensors may be relied upon to warn a user or even stop the personal lift device 100, 400 from moving (or adjusting the work platform 402) in a direction calculated based on sensor input to be dangerous to the user, the device, or bystanders. Further, a personal lift device 100, 400 may have one set of guidelines with respect to proximity and speed around some classes of objects, and another set of guidelines when navigating with respect to people or other classes of objects. For example, a personal lift device 100, 400 may allow itself to maneuver within 12" of a fixed barrier, but only within 24" of a bystander or drop off. Lights 430 may be used to provide warning and/or additional illumination for the cameras 912 and other sensors. The lights 430 may also be work lights provided at various locations on the personal lift device 100, 400.

Warnings may also be indicated by the lights 430, by a speaker 910, the control panel 428, or other means. Some warnings may be overridden by a user by communicating with the microcontroller via the control panel 428, pressure sensors 909, and/or pedals 414. However, some warnings may be provided for information only, and cannot be overridden. For example, a depleted battery or an overload condition may be informational only such that a user is aware of the reason for potentially unexpected or undesirable performance.

Personal lift devices (100, 400) can be provided with wireless communications modules 904. This may be integrated with the microcontroller 901 or as a separate device (possible off-the-shelf) and communicatively coupled to the microcontroller 901. The wireless module 904 may implement Wi-Fi, Bluetooth, or another known protocol. This may allow all or some functions of the personal lift device 100, 400 to be access remotely. Updates may be provided remotely and data that is logged may be transmitted for storage off the personal lift device 100, 400.

In some embodiments, a single user on one personal lift device 100, 400 may control additional personal lift devices (carrying supplies, equipment, etc.). Control of the follower device may be implemented via the control panel 428. Non-occupied personal lift devices 100, 400 may also be programmed to operate autonomously, or semi-autonomously. For example, with appropriate safety and control routines running on the microprocessor 901, it may be possible to send a persona lift device 100, 400 back along a path previously traversed (e.g., for supplies, or to return items to personnel). Naturally object detection and avoidance would be a component of such embodiments. Further, schematics or floor plans may be accessible to the microcontroller 901 to enable easier autonomous or semiautonomous movement, particularly where a personal lift device 100, 400 may be operating in the same area for an extended period of time.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

It should be understood that the term "selectively" means that a feature, device, function, or structure may or may not be deployed or active all the time, but the necessary components and structure to enable the deployment or activation thereof are necessarily present. A selective feature or operation not recited in a claim, is not intended to be limiting to that claim.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A device comprising:
   a work platform;
   a drive unit that selectively moves the work platform over a work surface, the drive unit comprising a wheel base and a tilt platform affixed thereto via a joint that allows for adjustment of an angle between the tilt platform and the wheel base in any direction;
   a lift mechanism that selectively elevates the work platform above the drive unit;
   a pair of levelers attached to both the wheel base and the tilt platform and being selectively operable to adjust the angle between the tilt platform and the wheel base; and
   a microcontroller operable to adjust the levelers, and an accelerometer communicatively coupled to the microcontroller, the microcontroller adjusting the angle between the tilt platform and the wheel based using input from the accelerometer;
   wherein the drive unit provides the ability to move in any direction and to rotate in place.

2. The device of claim 1, wherein the drive unit includes a plurality of Mecanum wheels.

3. The device of claim 1, further comprising a pair of telescoping uprights rigidly affixed to the tilt platform and the wheel base, the lift mechanism elevating the work platform by extension of the pair of telescoping uprights.

4. The device of claim 3, wherein each of the pair of telescoping uprights comprises an inner segment joined to the tilt platform, and an outer segment joined to the work platform, the inner segment being slidingly engaged into the outer segment.

5. The device of claim 4, wherein the lift mechanism comprises a chain affixed along a length of at least one of the inner segments of the pair of telescoping uprights and an electric motor configured to traverse the work platform along the chain.

6. The device of claim 1, further comprising at least one input sensor and a microcontroller communicatively coupled thereto, the microcontroller controlling operation of the drive unit and being configured to avoid moving the drive unit with a predetermined distance of a predetermined obstacle.

7. A device comprising:
   a drive unit having a wheel base including a sufficient quantity of Mecanum wheels to allow translation in 365 degrees and rotation in place;
   a work platform joined to the drive unit and having an elevation mechanism that raises and lowers the work platform relative to the drive unit; and
   a leveling joint that allows the work platform to change its angle relative to the drive unit such that the work platform maintains a predetermined work angle regardless of the angle of the drive unit;

a pair of telescoping uprights joining the work platform to the drive unit;

wherein the elevation mechanism raises and lowers the work platform by extension and contraction of the telescoping uprights; and wherein at least one of the pair of telescoping uprights extends above a footpad of the work platform to form part of a user safety cage.

8. The device of claim 7, wherein the drive unit further comprises a tilt platform rigidly affixed to the work platform and the levelling joint.

9. The device of claim 8, further comprising a pair of actuators joined to the tilt platform and the wheel base and spaced apart from the levelling joint, the actuators configured to change a distance between the tilt platform and the wheel base at their respective locations, thereby adjusting the angle between the tilt platform and the wheel base.

10. The device of claim 7, wherein the drive unit comprises a plurality of electrically driven Mecanum wheels.

11. The device of claim 7, wherein the drive unit further comprises a tilt platform to which the work platform is affixed, the tilt platform allowing an angle between the drive unit and the work platform to be altered.

12. The device of claim 11, wherein the angle between the drive unit and the work platform is alterable in 365 degrees of freedom.

13. A device comprising:

a work platform;

a drive unit that selectively moves the work platform over a work surface, the drive unit comprising a wheel base and a tilt platform affixed thereto via a joint that allows for adjustment of an angle between the tilt platform and the wheel base in any direction; and a lift mechanism that selectively elevates the work platform above the drive unit;

a pair of levelers attached to both the wheel base and the tilt platform and being selectively operable to adjust the angle between the tilt platform and the wheel base; and a microcontroller operable to adjust the levelers and a gyroscope communicatively coupled to the microcontroller, the microcontroller adjusting the angle between the tilt platform and the wheel base using input from the gyroscope.

* * * * *